United States Patent [19]

Jaunarajs

[11] 4,191,585
[45] Mar. 4, 1980

[54] ALKALI RESISTANT GLASS ARTICLE AND METHOD OF PREPARATION

[75] Inventor: Karlis L. Jaunarajs, Littleton, Colo.

[73] Assignee: Johns-Manville Corporation, Denver, Colo.

[21] Appl. No.: 918,976

[22] Filed: Jun. 26, 1978

[51] Int. Cl.² .............................................. C04B 31/06
[52] U.S. Cl. .................................... 106/99; 428/392; 106/50; 427/220; 260/42.18
[58] Field of Search ................... 106/99, 50; 428/392; 429/220, 190; 260/42.18

[56] References Cited

U.S. PATENT DOCUMENTS

| | | | |
|---|---|---|---|
| 2,019,021 | 10/1935 | O'Brien | 427/220 |
| 2,022,750 | 12/1935 | Toohey | 65/3 R |
| 2,170,434 | 8/1939 | Seigle | 106/99 |
| 2,728,949 | 1/1956 | Sweet | 65/3 C |
| 3,025,588 | 3/1962 | Eilerman | 428/392 |
| 3,413,186 | 11/1968 | Marzocchi | 428/392 |
| 3,940,357 | 2/1976 | Fahey | 488/392 |
| 4,013,478 | 3/1977 | Meyer | 106/99 |

*Primary Examiner*—O. R. Vertiz
*Assistant Examiner*—Mark Bell
*Attorney, Agent, or Firm*—Robert M. Krone; Joseph J. Kelly; James W. McClain

[57] ABSTRACT

Alkali resistant glass articles are disclosed comprising glass fibers coated with zinc stearate. The coating will be present as 1 to 50, preferably 3 to 10, percent by weight of the coated fiber. The zinc stearate may be applied as a powder and converted to a coating by heating, or may be applied to the fibers from a water suspension.

20 Claims, No Drawings

ALKALI RESISTANT GLASS ARTICLE AND METHOD OF PREPARATION

BACKGROUND OF THE INVENTION

The invention herein relates to alkali resistant glass articles. More particularly it relates to coatings to impart alkali resistance to glass fibers.

When glass fibers are used in alkaline environments, such as when they are used as fibrous reinforcement for Portland cement, they are rapidly attacked by the alkali and deteriorate rapidly. Since economic and environmental considerations have made the use of glass fiber for cement reinforcement much more attractive in recent years, there have been numerous efforts to render glass fiber less susceptible to alkaline attack. These efforts have had two principal directions: first, much effort has been directed toward developing glass compositions which are themselves resistant to alkaline attack. For instance, one type of glass composition which is commercially used and considered moderately alkaline resistant contains large amounts of zirconia. Fibers made of such compositions deteriorate much less rapidly in an alkaline environment than do fibers made of conventional glass compositions such as the well known "E glass." The alkali resistant glass compositions, however, are quite expensive and thus cannot be readily used for such purposes as cement reinforcement without unduly raising the cost of the finished cement product.

The second approach to imparting alkali resistance to glass articles has been to develop coatings for the glass fibers which will prevent the alkaline components from contacting and attacking the glass surface. Use of such coatings is intended to allow the glass fiber to be composed of inexpensive and conventional materials such as those in the aforementioned "E glass." Alternatively, use of such coatings on fibers of alkali resistant glass compositions would enhance that alkali resistance and significantly extend the useful life of the expensive alkali resistant fibers, thus improving the economics of their use for cement reinforcement and similar uses.

A number of possible coatings have been suggested in the prior art. Of these the coatings most pertinent to the present invention are those described in U.S. Pat. No. 4,013,478 issued to Meyer. Alkali resistance is imparted in the Meyer invention by coating the glass fibers with water soluble zinc salts of weak acids, particularly zinc acetate, zinc formate, or zinc oxalate. Such coatings provide only limited alkali resistance to glass fibers, particularly under more severe conditons, and because of their water solubility can be detrimentally affected by the water present in Portland cement during the cement curing process.

It is therefore an object of this invention to provide a coating for glass fiber which will impart a significant degree of alkali resistance to the glass fiber, and which can be readily applied, and which is retained on the glass fiber in an alkaline, especially cement, environment. It is also an object of the invention to provide an alkali resistant coated glass fiber article.

BRIEF SUMMARY OF THE INVENTION

The invention herein is a fibrous glass article which is resistant to an alkaline environment and which comprises glass fiber coated with a coating comprising zinc stearate. In particular embodiments the glass fiber may be a non-alkali-resistant glass composition or an alkali resistant glass composition. In a preferred embodiment the sole significant component of the coating is zinc stearate. Also part of the invention is the method of imparting enhanced alkali resistance to glass fiber by coating it with zinc stearate.

DETAILED DESCRIPTION AND PREFERRED EMBODIMENTS

The zinc stearate used herein as a glass fiber coating can be any zinc stearate of commerce. Zinc stearate is commonly considered to be the zinc salt of stearic acid with the formula: $Zn(C_{18}H_{35}O_2)_2$. When used herein it may be in a finely powered form, it may be used molten at elevated temperatures (since its melting point is approximately 120° C.) or it may be dispersed in water. It is particularly advantageous to dust zinc stearate powder onto the glass fibers to be coated and then heat the dusted glass fibers to melt the zinc stearate and allow it to flow and coat the glass fibers. Alternatively, the zinc stearate can be suspended in water and sprayed onto the fiber, thus leaving the zinc stearate as a deposited coating when the water evaporates or is driven off by subsequent heating of the fibers.

To provide an adequate coating the zinc stearate must be present as from 1 to 50 percent by weight of coated fiber, preferably 3 to 10 percent by weight of coated fiber. Quantities less than this will not satisfactorily coat the fiber, while quantities in excess do not further enhance the alkali resistance and therefore are wasted. When used as a water suspension, the zinc stearate will normally be suspended in the water in an amount of from 5 to 450 g/l of suspension, preferably 30 to 70 g/l.

The examples summarized in the Table below will illustrate the invention herein. In each of these Examples coated and uncoated glass strands were tested for tensile strength both before and after exposure to an alkaline environment. The results are reported as tensile strength retention based on the original untreated form of the glass fiber (and, in some cases, as indicated in parentheses, also as based on the original glass as coated but prior to alkali exposure). In Example 1 the glass used was a conventional "E glass" which was coated with a standard commercial sizing material. This size contained a polyvinyl acetate film former, lubricants and a silane and is typical of the glass fiber sizes shown in numerous patents, including U.S. Pat. Nos. 3,116,192; 3,245,938; 3,249,411; 3,262,809; and 3,655,353. Normally such sizes are applied to the glass fibers to allow them to be handled with reduced abrasion, to reduce the electrostatic forces on the surface of the glass fibers, and to make them more compatible with resins when they are used for resin reinforcement. The presence or absence of such conventional sizes does not affect the present invention. In practice it would be expected that some type of size would be applied to the glass particularly for antistatic and antiabrasion purposes. The zinc acetate treating agent of Example 1 was prepared for comparison purposes according to the disclosure of aforementioned U.S. Pat. No. 4,013,478. The amounts of zinc acetate and zinc stearate used in Example 1 were chosen to provide the same amounts (about 1% by weight) of zinc oxide equivalent.

In the Examples 2, 3 and 4, the glasses "AR-1", "AR-2", and "AR-3" are, respectively, two commercial alkali resistant glasses with zorconia contents of approximately 10% to 15%, while the third is an experimental alkali resistant glass with a zirconia content of approximately 7%. The experimental alkali resistant glass was coated with a size of the type described above. The exact nature of the types of sizes on the commercial glass samples are not known but are believed to be generally similar to those described above.

In all the Examples the alkali exposure was exposure to a material known as "Lawrence Solution" which was generally considered to be a synthetic cementitious environment (see U.S. Pat. No. 3,973,974). This solution is formed of 0.88 g/l NaOH, 3.45 g/l of KOH, and 0.48 g/l of Ca(OH)$_2$ suspended in distilled water and having a pH of approximately 13.0.

| Example No. | Type of Glass | Alkali Resistant Coating | | Alkali Exposure | | Tensile Strength Retention, % |
|---|---|---|---|---|---|---|
| | | Type | Quantity | Time, hrs | Temp., °C. | |
| 1 | E | A) none | — | — | — | 100 |
| | | B) none | — | 48 | 50 | 36 |
| | | zinc acetate | 1% | 48 | 50 | 30 |
| | | zinc stearate | 5.4% | 48 | 50 | 35 |
| | | C) none | — | 24 | 70 | 21 |
| | | zinc stearate | 5.4% | 24 | 70 | 38 |
| 2 | AR-1 | A) none | — | — | — | 100 |
| | | zinc stearate | 7.2% | — | — | 88 (100) |
| | | B) none | — | 48 | 50 | 58 |
| | | zinc stearate | 7.2% | 48 | 50 | 66 (74) |
| 3 | AR-2 | A) none | — | — | — | 100 |
| | | zinc stearate | 5.7% | — | — | 129 (100) |
| | | B) none | — | 48 | 50 | 73 |
| | | zinc stearate | 5.7% | 48 | 50 | 119 (92) |
| 4 | AR-3 | A) none | — | — | — | 100 |
| | | zinc stearate | 4.5% | — | — | 113 (100) |
| | | B) none | — | 48 | 50 | 79 |
| | | zinc stearate | 4.5% | 48 | 50 | 98 (87) |

From Example 1 it will be evident that the zinc stearate significantly protected the glass from alkali attack. Further, when compared directly against the zinc acetate of the Meyer process the zinc stearate was significantly better. The protection afforded by the zinc stearate is particularly apparent when more severe conditions are involved (Example 1-C). It is believed that data developed under more severe conditions with the Lawrence Solution are substantially more significant in evaluating alkali resistant characteristics of glasses and glass coatings, since severe conditions more adequately simulate long-term alkali exposure, and most glass reinforced cement compositions would be expected to have service lives of many years. The low severity Lawrence Solution results can be considered to represent only short-term alkaline exposure and are therefore of less importance than the long-term exposure protection indicated by the more severe tests.

Examples 2, 3 and 4 illustrate that the zinc stearate coatings of this invention are effective in improving the life of alkali resistant glass compositions. For instance, in Example 2 a commercial alkali resistant uncoated alkali resistant glass loses 42% of its tensile strength in a 48-hour Lawrence test. The same glass coated with zinc stearate, however, loses only 26% of the tensile strength of the original glass. Similarly, in Example 3 the uncoated glass loses 27% of its tensile strength, while the coated glass loses only 8%.

It will therefore be evident that the zinc stearate coatings of this invention provide significant alkali resistance to nonalkaline resistant glass compositions, especially under more severe conditions, and substantially enhance the alkali resistance of alkali resistant glass compositions. Also, the compositions of this invention are significantly better than the water soluble zinc salts of the prior art, specifically Meyer's zinc salts of weak acids.

What is claimed is:

1. A glass fiber article having enhanced alkali resistance which comprises glass fiber coated with zinc stearate, said zinc stearate being present in an amount of from 1 to 50 percent by weight of coated fiber.

2. An article as in claim 1 wherein said zinc stearate is present in an amount of from 3 to 10 percent by weight of coated fiber.

3. An article as in claim 1 wherein said glass fiber is formed from a composition having relatively low alkali resistance.

4. An article as in claim 3 wherein said glass fiber is formed from an "E glass" composition.

5. An article as in claim 1 wherein said glass fiber is formed from a composition having relatively high alkali resistance.

6. A reinforced article comprising an alkaline cementitious matrix having suspended therethrough glass fiber coated with zinc stearate, said zinc stearate being present on said fiber in an amount of from 1 to 50 percent by weight of coated fiber.

7. An article as in claim 6 wherein said zinc stearate is present in an amount of from 3 to 10 percent by weight of coated fiber.

8. A method of increasing the alkali resistance of glass fiber which comprises applying to the surface of said glass fiber a coating comprising zinc stearate, said coating containing zinc stearate in an amount of from 1 to 50 percent by weight of the coated fiber.

9. A method as in claim 8 wherein said zinc stearate is present as from 3 to 10 percent by weight of the coated fiber.

10. A method as in claim 8 wherein said zinc stearate is applied as a powder to said surface and then melted to cause it to flow and form said coating.

11. A method as in claim 8 wherein said zinc stearate is deposited on said surface from a water suspension.

12. A method as in claim 11 wherein said zinc stearate is present in said water suspension in an amount of from 5 to 450 g/l.

13. A method as in claim 12 wherein said zinc stearate is present in said water suspension in an amount of from 30 to 70 g/l.

14. A glass fiber article having enhanced alkali resistance which comprises glass fiber having thereon a coating consisting essentially of zinc stearate, said zinc stearate being present in an amount of from 1 to 50 percent by weight of the coated fiber.

15. An article as in claim 14 wherein said zinc stearate is present in an amount of from 3 to 10 percent by weight of coated fiber.

16. An article as in claim 14 wherein said glass fiber is formed from a composition having relatively low alkali resistance.

17. An article as in claim 16 wherein said glass fiber is formed from an "E glass" composition.

18. An article as in claim 14 wherein said glass fiber is formed from a composition having relatively high alkali resistance.

19. An article as in claim 14 wherein said coating further contains a size which does not affect the ability of the zinc stearate to provide alkali resistance to the glass fiber.

20. A reinforced article comprising an alkaline cementitious matrix having suspended therethrough the coated glass fiber article of claim 14.

* * * * *